Figure 1:
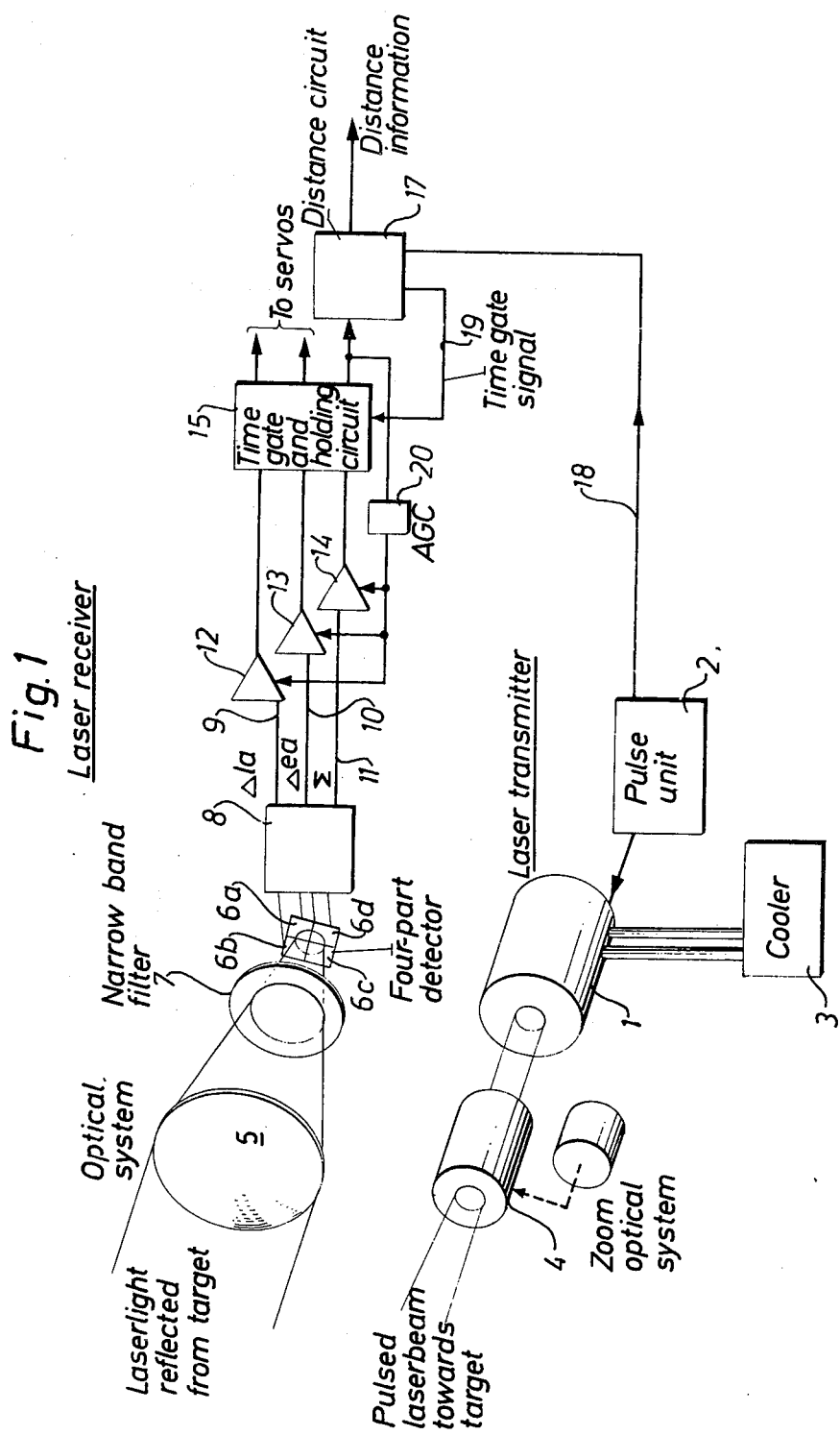

United States Patent [19]

Blomqvist et al.

[11] 3,954,340

[45] May 4, 1976

[54] METHOD OF AND APPARATUS FOR TARGET TRACKING

[75] Inventors: Åke Hugo Petrus Blomqvist; Bertil Torbjörn Eriksson, both of Karlskoga, Sweden

[73] Assignee: AB Bofors, Bofors, Sweden

[22] Filed: Mar. 11, 1974

[21] Appl. No.: 450,172

[30] Foreign Application Priority Data

Mar. 13, 1973 Sweden .............................. 7303520

[52] U.S. Cl. ............................ 356/152; 250/203 R; 250/216; 356/4; 356/5
[51] Int. Cl.² ...................... G01B 11/26; G01J 1/20
[58] Field of Search .......................... 356/4, 5, 152; 250/203 R, 216, 211 J; 244/3.16

[56] References Cited
UNITED STATES PATENTS

| | | |
|---|---|---|
| 2,070,178 | 2/1937 | Pottenger, Jr. et al. ......... 250/203 R |
| 3,133,200 | 5/1964 | Collyer ............................... 250/216 |
| 3,169,191 | 2/1965 | Knapp ............................... 244/3.16 |
| 3,497,695 | 2/1970 | Smith .............................. 250/203 R |
| 3,514,608 | 5/1970 | Whetter ................................. 356/4 |
| 3,792,268 | 2/1974 | Bjerke et al. ....................... 250/216 |

*Primary Examiner*—Maynard R. Wilbur
*Assistant Examiner*—S. C. Buczinski
*Attorney, Agent, or Firm*—Toren, McGeady and Stanger

[57] ABSTRACT

The invention relates to optical target tracking. A target image, particularly based on reflected laser light, is projected by an optical system onto a light-sensitive detector, control signals for directing purposes being generated depending on the position of the target image on the detector surface. At least when a clear target image on the detector surface would be small in comparison with the detector surface, the area of the target image is increased by blurring the target image, for instance by displacing the detector plane from the image plane of the optical system.

15 Claims, 6 Drawing Figures

METHOD OF AND APPARATUS FOR TARGET TRACKING

The present invention relates to automatic optical target tracking using light radiation reflected or emitted from a target, light radiation being taken to mean all types of optical radiation, i.e. from ultra violet to infrared radiation. The invention is particularly applicable in connection with so-called laser target tracking, where the target is illuminated continuously or pulsewise by a laser bean and where in certain fire controlling systems, for example, advantages are obtained in comparison with conventional radar target tracking.

For automatic optical target tracking the target is projected by means of an optical system on a light-sensitive detector using light radiation from the target. Depending on the position of the target image on the surface of the detector, which is divided into a number of part-surfaces, for example four quadrants, error signals are produced which are used to direct the optical system towards the target. The magnitudes of the error signals are dependent on the differences between the light flows falling on specific combinations of the part-surfaces. For each error signal curve, i.e. the curve showing the error signal as a function of the corresponding error angle between the direction to the target and the direction of the axis of the optical system, therefore, the inclination will be dependent on the area of the target image on the detector surface, this area for a specific optical system being directly dependent on the size and distance of the target. Thus, an extremely small (pin-point) target image in relation to the detector surface means that the inclination of the error signal curve will be infinitely great, whereas a target image having a larger area than the detector surface will result in inclination zero, i.e. a dead zone, for small error angles. Since the inclination of the error signal curve enters a servo system being used in the form of an amplification factor, in order to avoid instability problems it is essential to minimize the variations in the area of the target image on the detector surface during target tracking. This can of course be done using a so-called zoom lens which is capable of providing constant image area while producing a clear image, for varying distances and sizes of the target. However, this solution is expensive and relatively complicated.

The object of the present invention is consequently to provide a method of and an apparatus for optical target tracking, whereby the problems mentioned above are eliminated or considerably reduced in a simple and inexpensive manner. This is achieved by the method and the apparatus according to the invention being given the features defined in the accompanying claims.

The method according to the invention is thus essentially characterised in that at least when a clear target image in the image plane of the optical system would be small in comparison with the detector surface, the area of the target image on the detector surface is increased, which can easily be done in various ways.

The degree of blurredness may be constant but it may also suitably be varied depending on the distance to the target, for example so that at great target distances the image has a constant, strong blurredness, which then is decreased as the distance to the target decreases. At the smallest target distance the image is preferably quite sharp.

The degree of blurredness may also be varied depending on the size of the target image on the detector surface. In certain cases it may be suitable to vary the degree of blurredness depending both on the distance of the target and on the size of the target image.

A preferred method of making the target image blurred is to move the detector plane from the image plane of the optical system along the optical axis. The degree of blurredness, i.e. the increase in area of the target image, will then vary directly with the distance between the image plane of the optical system and the detector plane, and the area of the target image can therefore easily be adjusted to various target distances and target sizes by displacement of the detector plane. The displacement of the detector plane can be controlled by target distance information obtained in the target tracking system or elsewhere, and/or depending on detector signals indicating that the target image has reached a predetermined extension on the detector surface.

Another way of making the target image unsharp is by producing two or more images of the target on the detector surfaces, these images being displaced in relation to each other. Each displaced image may be individually sharp, but in spite of this the combined image will be blurred and spread out. When using a detector surface divided into four quadrants, it is preferable to produce four images of the target on the detector surface, these images being symmetrically displaced with respect to each other. The displacement is preferably not greater than that required to prevent an unilluminated area at the centre of the detector surface with the smallest possible target image.

Another way of making the target image blurred is to diffusely spread the light radiation falling on the detector surface from the optical system.

The apparatus according to the invention is characterised in that it comprises means arranged to make the target image on the detector surface unclear, thereby increasing the area of the image on the detector surface. In its simplest embodiment said means comprises spacer means, preferably adjustable, to keep the detector plane at a distance from the image plane of the optical system. The means may also comprise ray spreading means, for example an optical prisma disc, to produce two or more images of the target on the detector surface, displaced in relation to each other, or means for spreading the rays diffusely, for example a frosted or depolished plate, to give an entirely diffuse expanded image on the detector surface.

In order to permit adjustment of the degree of unsharpness (blurredness) to the size of the target image, the detector surface may be divided into two preferably ring-shaped zones around the optical axis of the system. The degree of blurredness and thus the area of the target image if, possible, is decreased by the effect of said means being reduced or entirely removed at a predetermined level of a signal obtained from the outer detector zone.

It is obvious that one or more of the methods described above for producing unsharpness of the target image on the detector surface can be combined in one and the same arrangement.

In the following the invention will be further described with reference to the accompanying drawings, in which FIG. 1 shows in principle the construction of an apparatus for automatic laser target tracking, and FIGS. 2, 3a, 3b, 3c and 4 illustrate schematically various methods of effecting unsharpness (blurredness) in the arrangement according to FIG. 1.

The arrangement according to FIG. 1 comprises a laser transmitter and a laser receiver being in the form of separate units stationarily arranged relative to each other and being located in conventional manner on a frame, for example a gun-carriage, which is adjustable both in azimuth and elevation, that is with respect to lateral angle (*la*) and elevational angle (*ea*), respectively, by means of servos. The laser transmitter comprises a laser light source 1 which, controlled by a pulse unit 2, periodically emits laser light pulses and which is cooled by a cooler 3, as well as a zoom lens 4 to set a suitable lobe width.

The laser receiver comprises a receiver optical system 5 arranged to give an image of the target on a photo-electric detector 6 by means of laser light reflected from the target. A narrow band filter 7 which allows light of the laser frequency to pass through is arranged in the beam path of the optical system. The detector 6, which is of a semiconductor type, especially of a photo-avalanche diode type, has its light-sensitive surface divided into four quadrants or part-surfaces 6*a*, 6*b*, 6*c* and 6*d* which are electrically insulated from each other and each of which generates an electric pulse signal proportional to the quantity of light falling on respective quadrants for each received light pulse reflected from the target. The quadrants 6*a* – 6*d* are individually electrically connected to a total and difference forming circuit 8 which produces a lateral angle error signal $\Delta\, la$ on a first output 9 by subtracting the sum of the signals from the quadrants 6*a* and 6*d* from the sum of the signals from quadrants 6*b* and 6*c* and produces an elevational angle error signal $\Delta\, ea$ on a second output 10 by subtracting the sum of the signals from the quadrants 6*a* and 6*b* from the sum of the signals from quadrants 6*c* and 6*d* and also produces a total signal $\Sigma$ on a third output 11, said total signal being the sum of the signals from the four quadrants. The three pulse-shaped output signals from said circuit 8 are amplified in amplifiers 12, 13 and 14, after which they are supplied to a time gate and holding circuit 15 which is arranged to pass signals from the amplifiers 12 – 14 only when the circuit receives a time gate signal dependent on the target distance, and also in a conventional manner to convert the pulse-shaped error signals to continuous servo control signals which are used in the normal manner to direct the laser transmitter and the laser receiver so that the error signals tend towards zero.

The total signal pulse from the amplifier 14 is gated through the circuit 15 by the time gate signal for transfer to a distance circuit 17 in which the distance to the target is calculated by measuring the time taken by the laser pulse to reach the target and return, i.e. by measuring the time between a laser light triggering pulse from the pulse unit 2, which pulse is supplied to the distance circuit 17 through the connection 18, and the associated total signal pulse in the receiver. Based on the distance to the target calculated in the distance circuit, an estimate is made as to when the next laser pulse reflected from the target will be received and thus the next time gate signal be transferred to the circuit 15 via the connection 19.

The magnitude of the total signal pulse is sensed and held constant by an AGC-circuit 20 which automatically controls the amplification both in the amplifier 14 for the total signal channel and in the amplifiers 12 and 13 for the error signal channels. Thus, the dependence of the signal strength received on, for example, the distance to the target, will not affect the inclination of the error signal curves.

Figure 2:
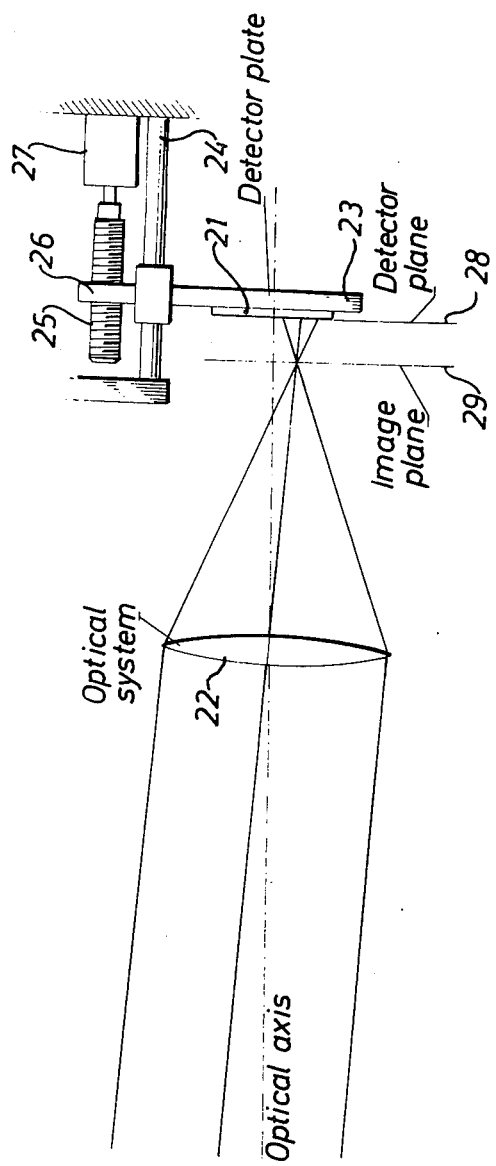
Figure 4:
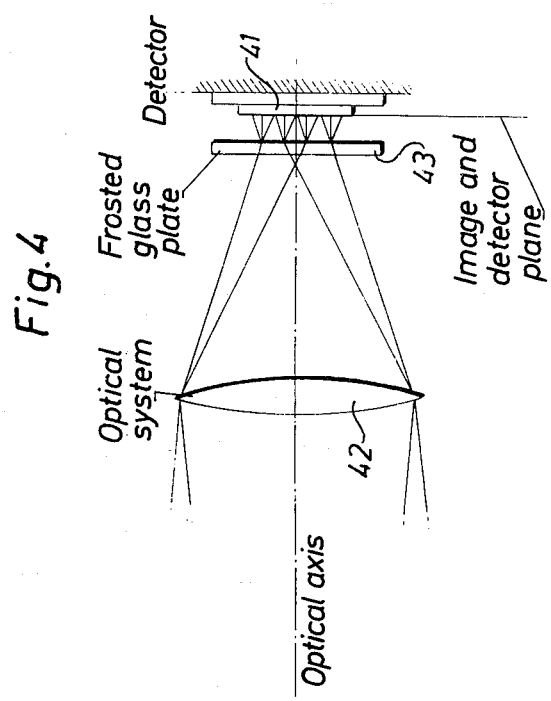

According to the invention the apparatus comprises means for making the target image blurred or unsharp. FIGS. 2 – 4 show schematically how such means may be designed and arranged. The receiver optical system is shown for the sake of simplicity in the form of a single positive lens and the ray path being simplified or entirely omitted.

In the arrangement according to FIG. 2 the detector comprises a detector plate 21 divided into part-surfaces insulated from each other. The detector plate is permanently fixed perpendicular to the optical axis of the receiver optical system 22, on a holder 23 carried by a guide 24 arranged parallel to the optical axis, said holder 23 being displaceable along the guide by means of a screw 25 cooperating with a threaded part 26 of the holder and rotatable by a motor 27. In the position shown in the Figure, the detector plate i displaced so that the detector plane 28 is displaced from the image plane 29 of the optical system along the optical axis. As illustrated by the schematically indicated light rays, therefore, each image point focussed in the image plane will be spread out over a greater area on the detector plate, due to blurredness or unsharpness.

The holder 23 is continuously displaceable between two end positions, a first end position in which the detector plane 28 coincides with the image plane 29 of the optical system and a second end position in which a predetermined maximum blurredness or unsharpness is obtained.

Figure 3A:
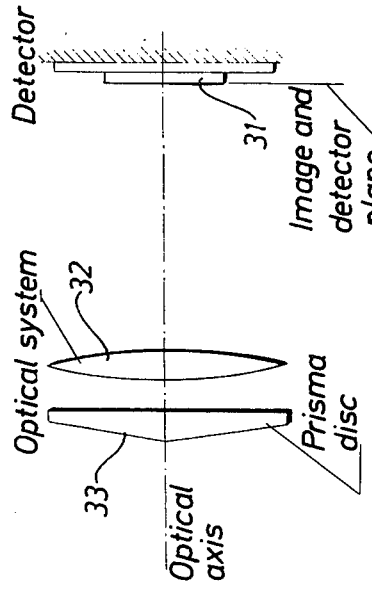
Figure 3C:
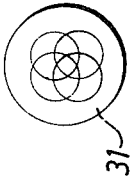
Figure 3B:
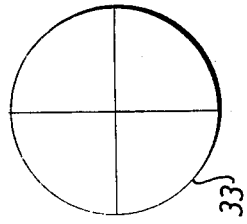

In the arrangement according to FIG. 3*a* a circular detector plate 31, divided into four quadrants, is secured so that the image plane of the optical system 32 and the detector plane coincide. In front of the optical system is an optical prisma disc 33 which is also divided into four symmetrical quadrants arranged in correspondence with the four quadrants of the detector plate, each of which produces an image of the target displaced into the corresponding detector quadrant, as illustrated by FIG. 3*c* showing the detector surface from the front on receiving a circular target image. The front appearance of the prisma disc 33 can be seen from FIG. 3*b*. The prisma disc may be arranged to be selectively insertable into the ray path in front of the optical system and removable therefrom and to be displaceable along the optical axis, for example in the manner described in connection with holder 23 in FIG. 2.

In the arrangement according to FIG. 4 the image on the detector plate 41 fixed in the image plane is made blurred or unsharp by the insertion of a frosted glass plate 43 perpendicular to the optical axis in the ray path between the optical system 42 and the detector 41. The frosted glass plate 43 is located relatively close to the detector plate 41 and gives a diffuse, enlarged image on the detector plate.

Thus, by means of the arrangements described above it is possible to impart a constant or variable degree of unsharpness or blurredness to the target image produced on the light-sensitive surface of the detector which will to a great extent reduce the sensitivity variation of the system caused by target distance and target size. Furthermore, the introduction of blurredness or unsharpness of the target image on the surface of the detector, resulting in the contours of the image being no longer sharp should mean that the influence of so-called glint, that is the displacement of the "centre of gravity" of the target image, is considerably reduced.

What is claimed is:

1. In a method of optical target tracking including the projecting of light radiation emitted or reflected from a target by an optical system on a light-sensitive detector arranged in a detector plane to produce an image of the target extending on the surface of the detector and the generating of control signals to direct the optical system towards the target to track the target depending on the position of the target image on the surface of the detector, the improvement comprising intentionally and positively defocussing the target image on the detector surface as a function of a parameter associated with the target so that variations of the extension of said target image on the detector surface during a tracking procedure are substantially reduced.

2. A method according to claim 1, wherein the step of defocussing the target image includes moving the detector plane relative to the image plane of the optical system.

3. A method according to claim 1, wherein the step of defocussing the target image includes producing two or more images of the target on the detector surface and displacing the images relative to each other.

4. A method according to claim 1, wherein the step of defocussing the target image includes diffusely spreading the light radiation from the optical system onto the detector surface.

5. A method according to claim 1, wherein the step of defocussing the target image on the detector surface depends on the distance to the target.

6. A method according to claim 2, wherein the step of varying the distance between the image plane of the optical system and the detector plane depends on the distance to the target.

7. A method according to claim 1, wherein the step of defocussing the target image on the detector surface depends on the size of the target image.

8. Apparatus for optical target tracking and responsive to light radiation reflected or emitted from a target comprising: a light-sensitive detector, an optical system responsive to said light radiation for producing an image of said target extending on the surface of said light-sensitive detector which is arranged in a detector plane, means for producing control signals which are dependent on the position of the target image on the detector surface, said control signals for directing the optical system towards the target to track the target, and means for intentionally and positively defocussing the target image on the detector surface during tracking in response to a change of a parameter associated with said target, so that variations of the extension of said target image on the detector surface during tracking can be substantially reduced.

9. The apparatus according to claim 8 wherein said defocussing means varies in accordance with the distance to the target.

10. The apparatus according to claim 8 wherein said defocussing means varies in accordance with the size of the target image.

11. An apparatus according to claim 8, wherein said means for defocussing the target image includes means to vary the distance from the detector plane to the image plane of the optical system.

12. An apparatus according to claim 8, wherein said means for defocussing the target image includes means for producing two or more images of the target displaced in relation to each other on the detector surface.

13. An apparatus according to claim 12, wherein said producing means includes an optical prisma disc.

14. An apparatus according to claim 8, wherein said means for defocussing the target image includes means for diffusely spreading the light radiation falling on the detector surface from the optical system.

15. An apparatus according to claim 14, wherein said spreading means includes a frosted glass disc.

* * * * *